United States Patent [19]

Hobart et al.

[11] 4,449,694

[45] May 22, 1984

[54] BLOCKED BALL VALVE

[75] Inventors: Ralph J. Hobart; Robert D. Rupp, both of Westerville; Paul F. Mastro, Dublin, all of Ohio

[73] Assignee: Nibco, Inc., Elkhart, Ind.

[21] Appl. No.: 360,236

[22] Filed: Mar. 22, 1982

Related U.S. Application Data

[63] Continuation of Ser. No. 205,403, Nov. 10, 1980, abandoned.

[51] Int. Cl.³ ............................................. F16K 5/20
[52] U.S. Cl. ..................................... 251/171; 251/315
[58] Field of Search ................ 251/315, 171, 161, 188

[56] References Cited

U.S. PATENT DOCUMENTS

| 4,099,705 | 7/1978 | Runyan | 251/315 |
| 4,262,688 | 4/1981 | Bialkowski | 251/315 |
| 4,327,895 | 5/1982 | Blumenkranz | 251/315 |

Primary Examiner—Martin P. Schwadron
Assistant Examiner—James R. Shay
Attorney, Agent, or Firm—Price, Heneveld, Huizenga & Cooper

[57] ABSTRACT

The present invention relates to a ball valve having a housing with an axial passage way through the housing providing fluid communication between first and second ends of the housing. A rotatable ball is arranged within the axial passageway for selectively opening and closing the axial passageway. A seal is arranged within the axial passageway near the first end of the housing such that the seal is adapted to abut a surface on the rotatable ball. A blocking member is provided for selectively preventing axial movement of the seal towards the first end and for permitting axial movement of the seal towards the surface of the rotatable ball independently of the blocking member. In a preferred embodiment, the seal is arranged on a seal carrier which has an annular groove in an outer peripheral surface. The blocking member comprises an annular retaining ring which is threadedly secured within the axial passageway at the first end of the housing and is arranged in the annular groove in the outer peripheral surface of the seal carrier. An external diameter of the annular groove in the seal carrier is less than an internal diameter of the annular retaining ring. A connecting sleeve having a flange at one end adapted to abut a radial surface of the seal carrier selectively urges the seal carrier and the seal attached thereto into tight fitting engagement with the surface of the rotatable ball when a clamping nut is secured to an outer peripheral surface of the housing and urges the flange on the connecting sleeve into engagement with the seal carrier.

1 Claim, 2 Drawing Figures

BLOCKED BALL VALVE

This is a continuation of application Ser. No. 205,403, filed Nov. 10, 1980, now abandoned.

BACKGROUND AND SUMMARY OF THE PRESENT INVENTION

The present invention relates to a ball valve. More particularly, the present invention relates to a seal and a rotatable ball contained within a housing which seal and ball are blocked against movement out of the housing when connecting sleeves are disconnected from the housing.

Rotatable balls which selectively open and close an axial passageway in a ball valve housing are commonly used in fluid piping systems. It is desirable to provide a ball valve which can be disconnected from the system without causing the ball or seals about the ball to fly out of the housing, i.e., a blocked ball valve. It is also desirable to provide an apparatus for a ball valve which prevents outward movement of the ball but permits the seals about the ball, often carried by a seal carrier, to be adjustably biased against the ball to effectuate a tight fluid seal about the ball.

Numerous devices have been proposed which block a seal and ball in place. However, some of these devices have not provided any apparatus for urging the seal against the surface of the ball to improve sealing about the ball.

One known device is disclosed in U.S. Pat. No. 4,023,773 issued to Wise. The Wise patent discloses a true union ball valve in which a seal and a seal carrier are blocked by a split locking ring positioned against the seal carrier. The locking ring has an abutment thereon which engages an abutment in a housing to hold the locking ring in place. A cam ring is inserted between the seal carrier and the locking ring for expanding the locking ring into a groove which carries the abutment in the housing. A bonding socket is urged against the locking ring and the cam ring by a flanged nut thereby urging the seal on the seal carrier against the surface of a ball. A device of this type however does not permit free movement of the seal carrier without movement of the cam ring and the locking ring.

Another device is disclosed in U.S. Pat. No. 4,059,250 issued to Guldener et al. The Guldener et al patent discloses a seal for a ball valve which is carried by an insert ring. The insert ring is held in place within a housing for the valve by a bayonet-type connection including tabs on the insert ring which tabs slide within recesses on an inside peripheral surface of the housing. The recesses communicate with an annular groove on the inside peripheral surface of the housing. The ring is inserted into the housing and turned so that the tabs engage the annular groove in the housing to prevent movement of the insert ring away from the ball. However, a blocking device of this type may be inserted within the ball valve housing without rotating and locking the insert ring such that the ball is likely to fly out of the housing when the ball valve housing is disconnected from a connecting member.

A further device for holding a seal and a rotatable ball within a valve housing is disclosed in U.S. Pat. No. 3,669,406 issued to Moore. In the Mbore patent, the seal for the ball is held in place by a resilient annular retaining ring which abuts an outside surface of the seal. The retaining ring is received in an annular recess formed in the housing. A device of this type, however, does not permit movement of the seal on the ball without flexure of the resilient retaining ring. Since the retaining ring must move axially along with the seal, the resiliency of the retaining ring determines the maximum force which can be exerted by the seal against the ball.

A further device is disclosed in U.S. Pat. No. 3,458,171 issued to Urban which discloses a seat ring for a ball valve which is inserted into one end of a housing for a rotatable ball. An annular cap member is provided to maintain the seat ring in abutting engagement with the ball. The annular cap member is secured in position by a plurality of set screws which engage a wedge shaped groove in an outer peripheral surface of the cap member.

U.S. Pat. No. 3,420,408 issued to Wilcox discloses a fluid-tight coupling in which the conduits through which fluid flows to each half of the coupling may be misaligned without leakage of the fluid. A seal member arranged in a housing is pressed by a spring against a spherical end of one half of the coupling. The seal member is aligned by an annular extension of a first portion of the housing which is threaded to a second portion of the housing.

A further device is disclosed in U.S. Pat. No. 3,214,131 issued to Boldt et al which discloses a valve having an apparatus for moving a guiding bushing into a sealing position against the surface of a rotating valve element. The apparatus comprises a member arranged in a cyclindrical bore of the valve housing. The member is provided with a wedge or inclined surface cooperating with a corresponding wedge on the guiding bushing. Displacement of the member is accomplished by adjusting a screw which moves the wedge or inclined surface on the member radially into or out of engagement with the wedge on the guiding bushing.

Other devices for blocking ball valves within a housing are disclosed in U.S. Pat. Nos. 3,284,046 issued to Allenbaugh, Jr; 3,288,430 issued to Priese; 3,653,631 issued to Hurst; 4,172,584 issued to Legris; and 4,175,726 issued to Richards.

Accordingly, it is an object of the present invention to provide a ball valve which includes an arrangement for retaining a seal within a housing for the ball valve while permitting movement of the seal toward a surface of a rotatable ball independently of the arrangement for retaining the seal and the ball.

A further object of the present invention is to provide a ball valve which cannot be assembled within a fluid system without blocking the ball and seal against movement out of a ball valve housing.

It is still a further object of the present invention to provide a ball valve which includes a blocked seal and seal carrier but permits the seal carrier to be biased against the surface of a ball by a connecting sleeve pipe when the connecting sleeve is secured to a ball valve housing.

Another object of the present invention is to provide an arrangement for blocking a ball valve which is simple and inexpensive to manufacture yet maintains a ball and associated seals within a housing.

These and other objects of the present invention are achieved by a ball valve having a housing with an axial passageway through the housing. A rotatable ball arranged within the axial passageway selectively opens and closes the axial passageway and a seal arranged at one end of the housing within the axial passageway is adapted to abut a surface on the rotatable ball to seal the ball against fluid leakage. A blocking member threadedly connected within the passageway prevents axial movement of the seal toward the one end of the housing while permitting axial movement of the seal toward the surface of the ball independently of the blocking member under the urging of a seal pressurizing member.

In a preferred embodiment, the seal is carried on a first radial surface of a seal carrier and the blocking member comprises an annular ring arranged in an annular groove in an outer peripheral surface of the seal carrier. The annular groove extends along a portion of the axial length of the seal carrier from a second radial surface of the seal carrier facing the one end of the housing. An external diameter of the annular groove is less than an internal diameter of the annular ring. Also the axial length of the annular groove is preferably greater than the axial length of the annular ring.

Further, in the preferred embodiment of the present invention the annular ring includes a threaded outer peripheral surface which is secured to internal threads arranged within the housing adjacent the one end.

Still further, the seal pressurizing member is a connecting sleeve having a flange at a first end with a first side of the flange being adapted to abut the second radial surface of the seal carrier to urge the seal carrier towards the rotatable ball. The connecting sleeve is secured to the ball valve housing by a clamping nut having internal threads adapted to engage threads on an outer peripheral surface of the housing adjacent the one end. The clamping nut has an inwardly directed flange which engages a second side of the flange on the connecting member to adjustably urge the first side of the flange of connecting member into engagement with the second radial surface of the seal carrier as the nut is secured to the housing.

BRIEF DESCRIPTION OF THE DRAWINGS

Preferred embodiments of the present invention will now be described in greater detail with reference to the drawing figures wherein like members bear like reference numerals and wherein.

DETAILED DESCRIPTION OF THE PREFERRED EMBODIMENT

Figures 1, 2:
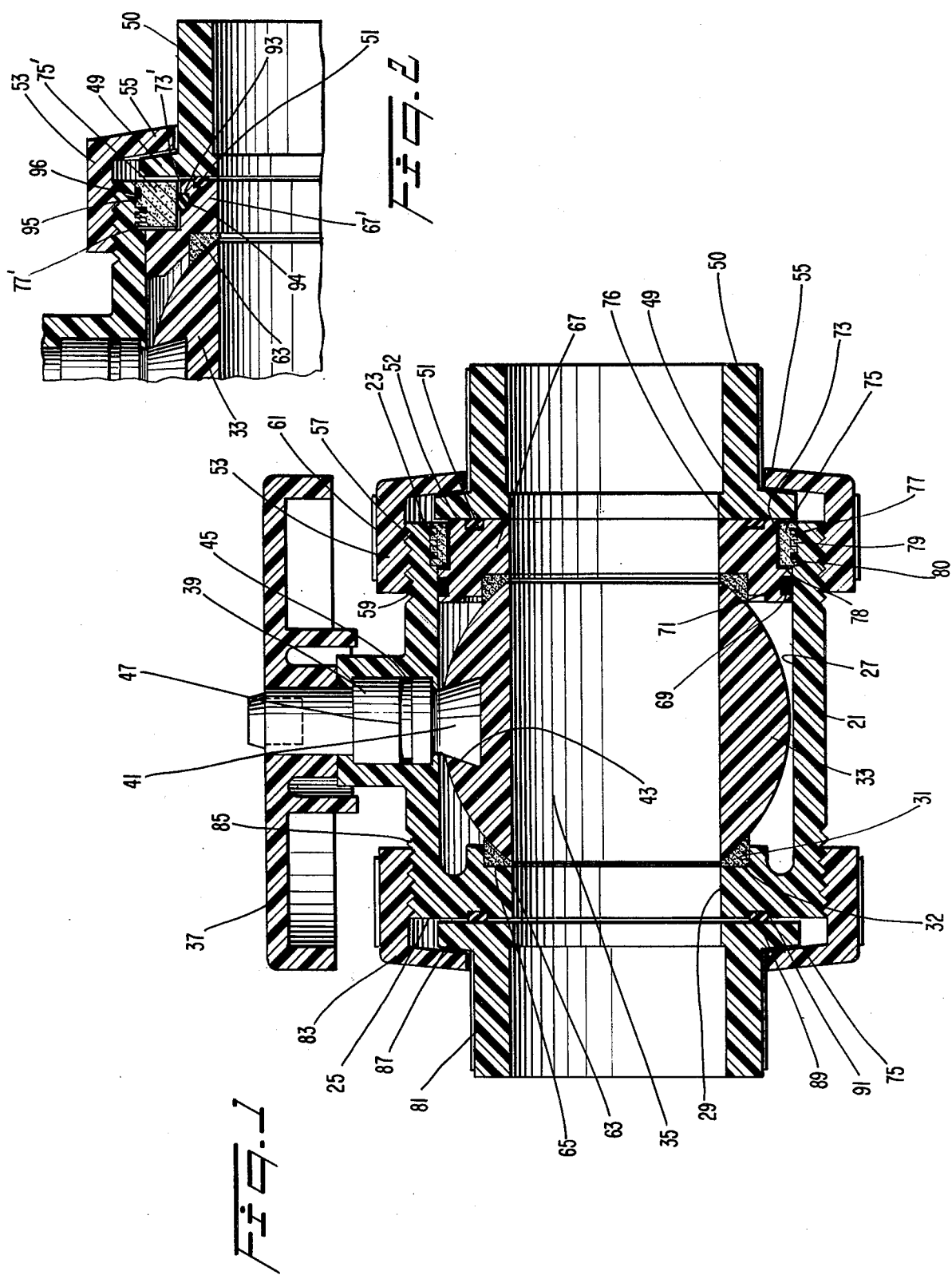
FIG. 1 is a cross-sectional view of a ball valve according to the present invention.
FIG. 2 is a partial cross-sectional view of a ball valve similar to FIG. 1 with a second embodiment of a seal carrier and blocking member according to the present invention.

With reference to FIG. 1, a housing 21 having a first end 23 and a second end 25 is provided with a generally cylindrical axial passageway 27. The passageway 27 includes a reduced diameter section 29 adjacent the second end 25 of the housing 21. A sealing ring 31 is secured in a recess 32 in the housing 21 at an edge of the reduced diameter section 29 of the axial passageway 27. A rotatable ball 33 having a borehole 35 therethrough is arranged within the housing 21 with the borehole 35 having a diameter generally corresponding to the diameter of the reduced diameter section 29 of the axial passageway 27. The rotatable ball 33 is arranged such that a surface of the ball abuts the sealing ring 31.

The ball 33 is arranged for selectively opening and closing the passageway 27 in the housing 21 so that fluid may flow from the first end 23 of the housing to the second end 25 of the housing 21 or vice versa. In other words, upon rotation of the ball 33 through an angle of 90° from the depicted position, the borehole 35 is perpendicular to a longitudinal axis of the axial passageway 27 in the housing 21. In this position, the surface of the ball 33 prevents flow of fluid through the axial passageway 27 of the housing 21. A further 90° rotation of the ball 33 in either direction re-aligns the borehole 35 with the axial passageway 27 to permit fluid flow through the housing 21.

Manipulation of the ball 33 between the open and closed positions is achieved by a handle 37 which is secured to a first end of a stem 39. A second end 41 of the stem 39 engages a slot 43 arranged in an upper surface of the ball 33. An O-ring 45 positioned within a groove 47 in the stem 39 seals the space between the stem 39 and the housing 21.

A seal carrier 67 arranged at the first end 23 of the housing 21 comprises an annular ring having an external diameter which is slightly less than an internal diameter of the axial passageway 27. Consequently, the seal carrier 67 slides relatively freely within the axial passageway 27 of the housing 21. The seal carrier 67 has an inside diameter which generally corresponds to the diameter of the borehole 35 in the ball 33. A seal 63 is secured in a groove 65 provided on a first radial surface of the seal carrier 67 remote from the first end 23 of the housing such that the seal 63 abuts the surface of the ball 33 when the seal carrier 67 is inserted in the axial passageway 27. The seal carrier 67 also includes a channel 69 in an outer peripheral surface of the seal carrier 67 which channel 69 receives a suitable sealing ring 71 to seal the space between the inside of the housing 21 and the seal carrier 67.

The seal carrier 67 includes an annular groove 73 which extends axially from a second radial surface 76 of the seal carrier 67 facing the first end 23 of the housing 21 along a portion of an axial length of the seal carrier 67.

An annular retaining ring 75 has an internal diameter which is slightly greater than an external diameter of the groove 73 and has an axial length which is less than the axial length of the groove 73 in the seal carrier 67. An outer peripheral surface of the retaining ring 75 includes external threads 77 which are adapted to engage internal threads 79 on an inside peripheral surface of the axial passageway 27 in the housing 21 adjacent the first end 23 of the housing 21. The axial length of the retaining ring 75 is preferably less than the axial length of the internal threads 79 within the housing 21 to ensure that the retaining ring 75 can be secured entirely within the housing 21.

When the annular retaining ring 75 is secured to the internal threads 79 in the housing 21 within the groove 73 in the seal carrier 67, the seal carrier 67 is permitted to move toward the second end 25 of the housing 21, i.e, toward the surface of the ball 33 independently of the annular retaining ring 75. However, the seal carrier 67 is prevented from moving outwardly toward the first end 23 of the housing 21 by an end surface 78 of the groove 73 which abuts an inner end 80 of the annular retaining ring 75 which is secured to the housing 21. In other words, the seal carrier 67 is permitted to move toward the second end 25 of the housing 21 to permit the seal 63 to more tightly engage the surface of the ball 33 to effectuate a more positive seal between the ball 33 and the seal 63.

A first end of a first connecting sleeve 50 is arranged at the first end 23 of the housing 21. The connecting sleeve 50 includes a flange 49 with a first side of the flange 49 being adapted to abut the second radial surface 76 of the seal carrier 67. A suitable sealing ring 51 arranged in a groove 52 in the second radial surface 76 of the seal carrier 67 prevents fluid from leaking between the first side of flange 49 and the first end 25 of the housing 21. A second end of the connecting sleeve 50 (not shown) is adapted to receive a pipe section.

A clamping nut 53 includes a radially inwardly extending flange 55 at one end which flange 55 engages a second side of the flange 49 on the connecting sleeve 50 to urge the flange 49 against the sealing ring 51 and the second radial surface 76 of the seal carrier 67. Internal threads 57 at a second end of the clamping nut 53 engage external threads 59 provided on an outer peripheral surface of the housing 21 adjacent the first end 23. Ribs 61 or another suitable grip are provided on an outer peripheral surface of the clamping nut 53 to facilitate a turning of the clamping nut 53 to secure the clamping nut 53 to the threads 59 on the housing 21 and to adjust the pressure applied to the seal carrier 67.

During assembly of the ball valve of the present invention, after inserting the ball 33 within the passageway 27 until the surface of the ball 33 abuts the seal 31 and securing the stem 39 in the slot 43 in the ball 33, the seal carrier 67 with the seal 63 and the sealing ring 71 secured thereto is inserted into the first end 23 of the housing 21. The annular retaining ring 75 is inserted into the annular groove 73 of the seal carrier 67 and secured to the housing 21 by engaging the external threads 77 on the annular retaining ring 75 with the internal threads 79 arranged on the inside peripheral surface of the passageway 27 adjacent the first end 23 of the housing 21. The annular retaining ring 75 is preferably screwed into the housing until no portion of the annular retaining 75 extends outwardly from the first end 23 of the housing 21.

As can be seen, since the annular groove 73 in the seal carrier 67 has an external diameter which is less than the internal diameter of the ring 75, the seal carrier and the seal 63 attached thereto are free to move in an axial direction toward the surface of the ball 33 within the housing 21. However, due to the annular ring 75 which is secured within the housing 21, the seal carrier 67 is prevented from moving outwardly from the housing 21 toward the first end 23 of the housing 21. It should also be noted that at this stage in the assembly of the ball valve the second radial surface 76 of the seal carrier 67 extends slightly beyond the first end 23 of the housing 21 since the axial length of the annular groove 73 in the seal carrier 67 is greater than the axial length of the annular retaining ring 75. The sealing ring 51 is also arranged in the groove 52 provided in the second radial surface 76 of the seal carrier 67 at this time.

The connecting sleeve 50 is arranged with the first side of the flange 49 abutting the second radial surface 76 of the seal carrier 67. The clamping nut 53 is slid along the connecting sleeve 50 until the internal threads 57 on the clamping nut 53 engage the external threads 59 on the outer peripheral surface of the housing 21 adjacent the first end 23. As the clamping nut 53 is rotated to tighten the clamping nut 53, the inwardly extending flange 55 of the clamping nut 53 engages the second side of the flange 49 on the connecting sleeve 50.

As the clamping nut 53 is further tightened, the first side of the flange 49 of the connecting sleeve 50 urges the seal carrier 67 and the seal 63 attached thereto into tight fitting engagement with the surface of the ball 33 since the seal carrier 67 is permitted to move axially toward the second end of 25 of the housing 21 independently of the annular retaining ring 75. The clamping nut 53 is tightened to any desired degree dependent upon the amount of wear to which the seal 63 has been subjected and the purpose for which the ball valve of the present invention is to be utilized. If the clamping nut 53 and the connecting sleeve 50 are subsequently disconnected, the ball 33 and the seal carrier 67 are blocked from movement toward the first end 23 and out of the housing 21 by the retaining ring 75.

At the second end 25 of the housing 21 a second connecting sleeve 81 and a second clamping nut 83 are provided. The second clamping nut 83 engages external threads 85 adjacent the second end 25 of the housing 21 to urge a flange 87 on the second connecting sleeve 81 into engagement with an end face of the housing 21 which forms the reduced diameter section 29 of the axial passageway 27. A suitable sealing ring 89 is provided in a groove 91 provided in the end face of the housing 21. It should be noted that the second end 25 of the housing may be provided with a blocked seal carrier similar to the arrangement at the first end 23 of the housing 21 instead of the reduced diameter section 29 of the axial passageway 27 if desired.

With reference to FIG. 2, a second embodiment of the present invention includes a seal carrier 67', which is similar to the seal carrier 67, having an annular groove 73' provided with an annular recess 93 for receiving a suitable seal 94. Also, an outer peripheral surface of an annular retaining ring 75' includes threads 77' and an annular recess 95 for receiving a suitable sealing ring 96 therein. The remaining structure and operation of the second embodiment of the present invention are substantially the same as that described with reference to FIG. 1.

The present invention provides a ball valve which is securely blocked by the retaining ring 75, i.e., the ball 33 and the seal carrier 67 cannot fly out of the housing when the clamping nut 53 and connecting sleeve 50 are removed. However, the arrangement of the present invention permits the seal 63, through the seal carrier 67, to adjustably engage the surface of the ball 33 independently of the annular retaining ring 75. In addition, by permitting movement of the seal 63 independently of the retaining ring 75, the seal can be more easily urged into tight fitting engagement with the surface of the ball 33. In other words, the blocking element, i.e., the retaining ring 75, does not interfere with the movement of the seal 63 and the seal carrier 67 and therefore less resistance (friction) to movement of the seal carrier 67 is encountered.

It should also be noted, that the first connecting sleeve 50 of the present invention cannot be properly joined to the housing 21 of the ball valve until the annular retaining ring 75 has been secured to the housing 21 and preferably has been inserted far enough into the housing 21 of the ball valve such that no portion of the annular retaining ring 75 extends outwardly from the first end 23 of the housing 21. By the arrangement of the present invention, it is practically impossible to assemble the ball valve without securely blocking the ball 33 and the seal carrier 67 within the housing 21 before securing the first connecting sleeve 50 and clamping nut 53 to the housing 21. The present invention also provides a blocked ball valve which is inexpensive to produce and contains few parts. In addition the present invention may be easily adapted to pre-existing ball valve structures by a relatively simple machining operation.

The principles and preferred embodiments of the present invention have been described in the foregoing specification. However, the invention which is intended to be protected is not to be construed as limited to the particular embodiments disclosed. The embodiments are to be regarded as illustrative rather than restrictive. Variations and changes may be made by others without departing from the spirit of the present invention. Accordingly, it is expressly intended that all such variations and changes which fall within the spirit and scope of the present invention as defined in the appended claims be embraced thereby.

What is claimed is:

1. A valve having a housing, an axial passageway for fluids through said housing communicating between first and second ends thereof, a ball rotatably seated in and between the ends of said passageway for controlling the movement of fluid through the passageway, an annular seal member having an external diameter that is less than the internal diameter of said axial passageway whereby said annular seal member is axially slidably received in one end of said passageway said annular seal member having a ball engaging seal element on one end, said valve characterized in that said seal member has an external annular recess at its outer end forming an outwardly facing shoulder, a locking ring threadedly mounted in said one end of said passageway and seated in said recess and engaging said shoulder to hold said annular seal member with the seal element in engagement with the ball and restrained against outward axial movement when the outer end of said locking ring is substantially flush with the end of the housing, said locking ring having an axial length that is less than the axial length of said external annular recess and said locking ring having an interior diameter that is greater than the exterior diameter of said recess whereby said annular seal member is axially inwardly movable with respect to said ring and the other end thereof projects outwardly beyond the end of said locking ring and said housing; a seal pressurizing means threadedly secured to the said one end of said housing and engaging the projecting end of said seal member for shifting said seal member toward said ball to increase the seal pressure and thus eliminate fluid leakage, a seat disposed on said housing at the face of said ball opposite from said one end of said ball for supporting said ball against axial movement under axial pressure exerted by said annular seal member, said seat comprising an annular compressible seal engaging said ball, said seal pressurizing means comprising a connecting sleeve flanged at one end, the flanged end seating against the projecting end of said annular seal member and an annular cap internally threaded to engage said one end of said housing and having an annular portion seated over said flanged end of said sleeve, first compressible seal means disposed between the projecting end of said annular seal member and said flange, and second compressible seal means disposed between at least one of said annular seal member and said locking ring, said annular seal member and an interior wall of said housing and said locking ring and an interior wall of said housing.

* * * * *